US007293963B2

(12) United States Patent

Ozelski et al.

(10) Patent No.: US 7,293,963 B2
(45) Date of Patent: Nov. 13, 2007

(54) REMOVABLE TAIL ROTOR BOOT

(75) Inventors: Joseph B. Ozelski, Shelton, CT (US); James E. Rothman, Hamden, CT (US); David L. Myers, Jr., Stratford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 423 days.

(21) Appl. No.: 11/031,651

(22) Filed: Jan. 5, 2005

(65) Prior Publication Data

US 2006/0147312 A1 Jul. 6, 2006

(51) Int. Cl.
*F03B 3/14* (2006.01)
*B64C 27/48* (2006.01)

(52) U.S. Cl. .................. 416/209; 416/247 R; 416/248

(58) Field of Classification Search ............ 416/247 R, 416/248, 244 R, 244 A, 224, 210 R, 211, 416/209
See application file for complete search history.

(56) References Cited

U.S. PATENT DOCUMENTS

| | | | | |
|---|---|---|---|---|
| 5,203,522 | A | 4/1993 | White et al. | |
| 6,405,457 | B1 * | 6/2002 | Basso et al. ................... | 36/89 |

* cited by examiner

*Primary Examiner*—Edward K. Look
*Assistant Examiner*—Dwayne J White
(74) *Attorney, Agent, or Firm*—Carlson, Gaskey & Olds

(57) ABSTRACT

A boot provides for removable attachment to a tail rotor assembly to flexibly protect the interior of the tail rotor blade assemblies. The boot includes a first fastener strip mounted adjacent a first boot edge and a second fastener strip mounted adjacent a second boot edge. The first and second fastener strips are "hook and loop" material to removably attach the edges which permits relatively uncomplicated installation and removal of the boot.

19 Claims, 5 Drawing Sheets

REMOVABLE TAIL ROTOR BOOT

BACKGROUND OF THE INVENTION

The present invention relates to a tail rotor system, and more particularly to a boot which may be replaced while minimizing disturbance of the preexisting tail rotor blade structure.

Conventional tail rotor systems are provided in a variety of different specific constructions. A cross-beam tail rotor blade system accommodates blade flap and pitch change motion by deflection of a flexible graphite fiber spar. The spar is a continuous member running from a tip of one tail rotor blade to a tip of the opposite tail rotor blade.

Pitch control horns mounted to the inboard section of each tail rotor blade are driven by actuators to deflect the tail rotor blades and flex the spar to provide a desired anti-torque action in response to pilot inputs. A boot is installed between the pitch control horn and a fairing attached to an inboard segment of each tail rotor blade skin. The boot flexibly protects the interior of the tail rotor blade assemblies as the tail rotor assembly is pitched to deliver the desired anti-torque action Disadvantageously, when damage/corrosion beyond predetermined limits occurs to the boot, the entire tail rotor system must be removed for disassembly to replace the boot. Furthermore, once installed, the area covered by the boot is difficult to access, which may increase maintenance time during an inspection. Removable of the entire tail rotor system is relatively time consuming and may increase the down time of the aircraft.

Accordingly, it is desirable to provide a boot which may be replaced in the field to minimizing disturbance of the preexisting tail rotor blade structure.

SUMMARY OF THE INVENTION

A boot according to the present invention provides for removable attachment to a tail rotor assembly. The boot includes a first fastener strip mounted adjacent a first boot edge and a second fastener strip mounted adjacent a second boot edge. The second fastener strip engages the first fastener strip to mount the boot to an inboard boot support and an outboard boot support. The first and second fastener strips are "hook and loop" material to removably attach the edges which permits relatively uncomplicated installation and removal of the boot to provide access for visual inspection, a relatively larger area to work with when adjusting the weights for the tail hub and should the boot become damaged, the tail rotor blade need not be removed and shipped to a rear area for rework.

The present invention therefore provides a boot which may be replaced in the field, thus minimizing disturbance of the preexisting tail rotor blade structure.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
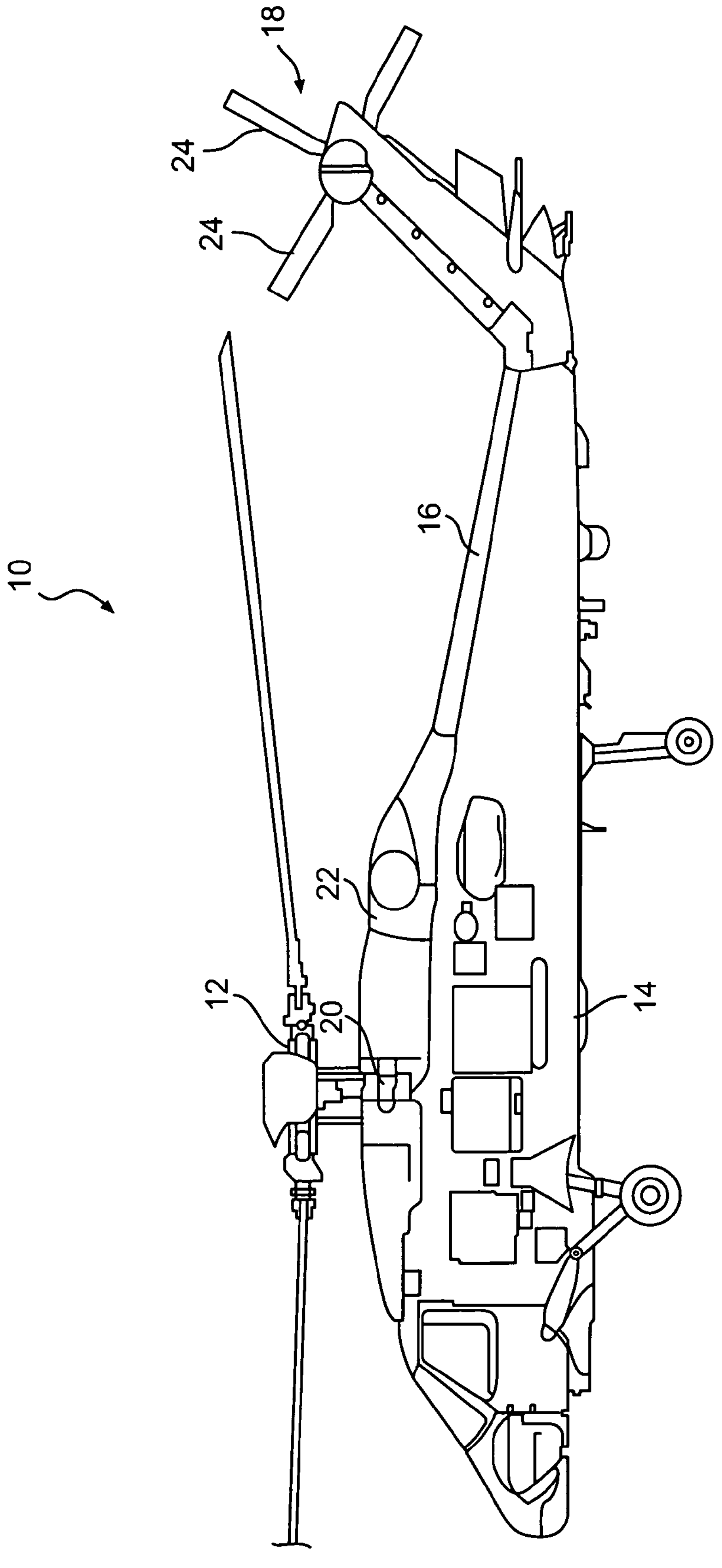
FIG. 1 is a general perspective view an exemplary rotary wing aircraft embodiment for use with the present invention.

FIG. 1 schematically illustrates a rotary-wing aircraft 10 having a main rotor assembly 12. The aircraft 10 includes an airframe 14 having an extending tail 16 which mounts an anti-torque tail rotor system 18. The main rotor assembly 12 is driven through a transmission (illustrated schematically at 20) by one or more engines 22. Although a particular helicopter configuration is illustrated in the disclosed embodiment, other machines such as turbo-props, tilt-rotor and tilt-wing aircraft will also benefit from the present invention.

Figure 2:
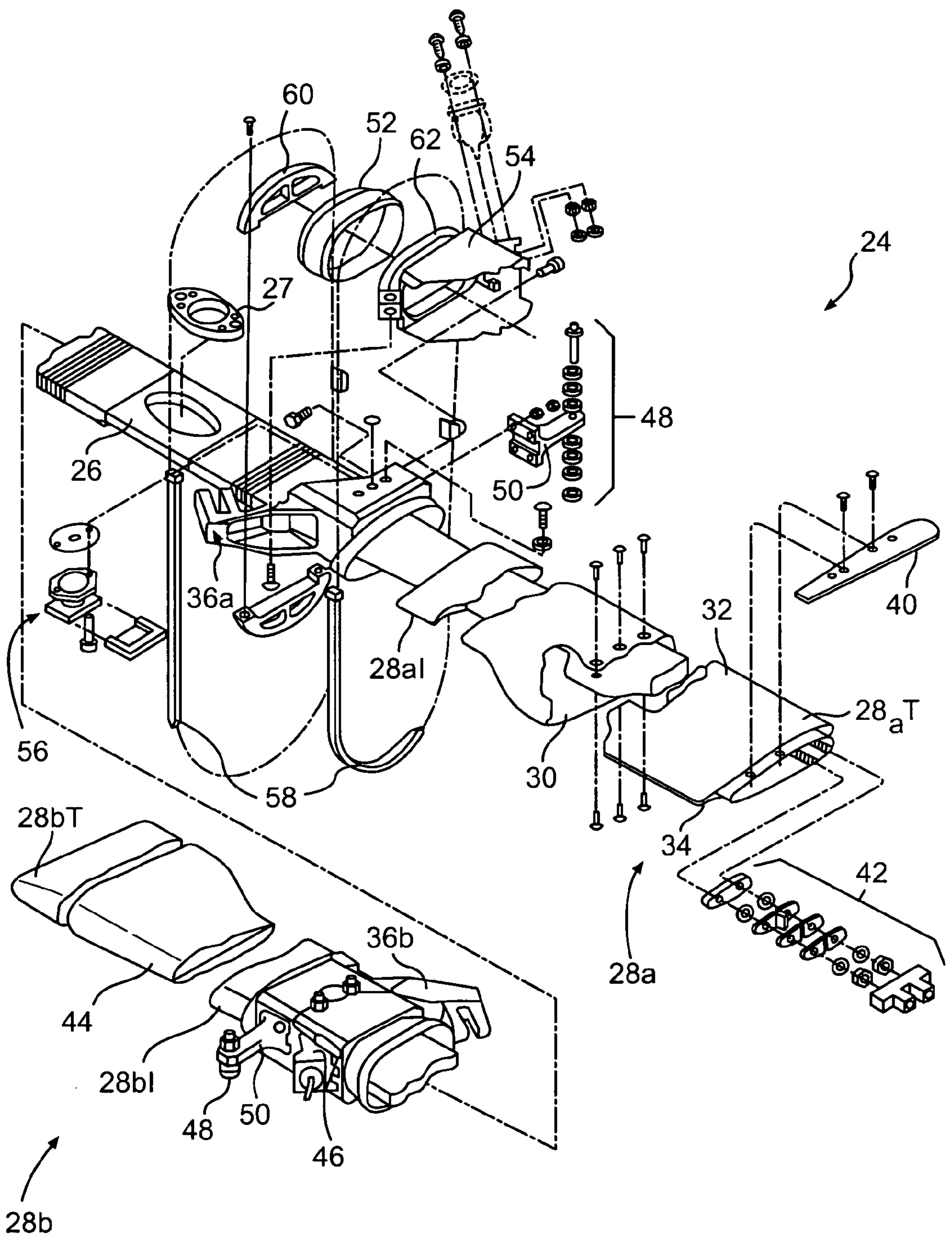
FIG. 2 is an exploded view of a tail rotor assembly.

Referring to FIG. 2, a tail rotor assembly 24 of the tail rotor system 18 is illustrated. The tail rotor assembly 24 may be a cross-beam tail rotor system which includes a spar 26 that accommodates blade flap and pitch change motion through deflection. Typically, two tail rotor assemblies *28a*, *28b* will be mounted opposite each other upon a single axle (FIG. 1) through a central mount aperture 27 located through the spar 26. The spar 26 is a continuous member running through a first tail rotor blade assembly *28a* and a second tail rotor blade assembly *28b*. The spar 26 extends from a tip segment ***28a*T, *28b*T of each tail rotor blade assembly *28a*, *28b*. Each tail rotor blade assembly *28a*, *28b* typically includes a core 30 with an upper and lower blade surface skin 32, 34 which forms the aerodynamic blade surface about the spar 26. A pitch control horn *36a*, *36b* is mounted to the inboard segment *28a*I, *28b*I of each tail rotor blade assembly *28a*, *28b***.

The tail rotor assembly 24 typically includes a tip cap assembly 40, a counterweight assembly 42, a leading edge heater mat assembly 44, a de-ice harness plug assembly 46, a chordwise balance weight 48, a balance bracket, 50, a resilient boot 52, a fairing 54 and a snubber bearing 56 from each blade assembly *28a*, *28b*. It should be understood that although a particular tail rotor component arrangement is disclosed in the illustrated embodiment, other arrangements will benefit from the instant invention.

The boot 52 is further retained by a set of tie down straps 58 which are preferably "zip-ties" or the like. The boot 52 is mounted between an inboard boot support 60 and an outboard boot support 62, here a portion of the fairing 54 attached to the inboard segment ***28a*I, *28b*I of each tail rotor blade assembly *28a*, *28b***.

Figure 3:
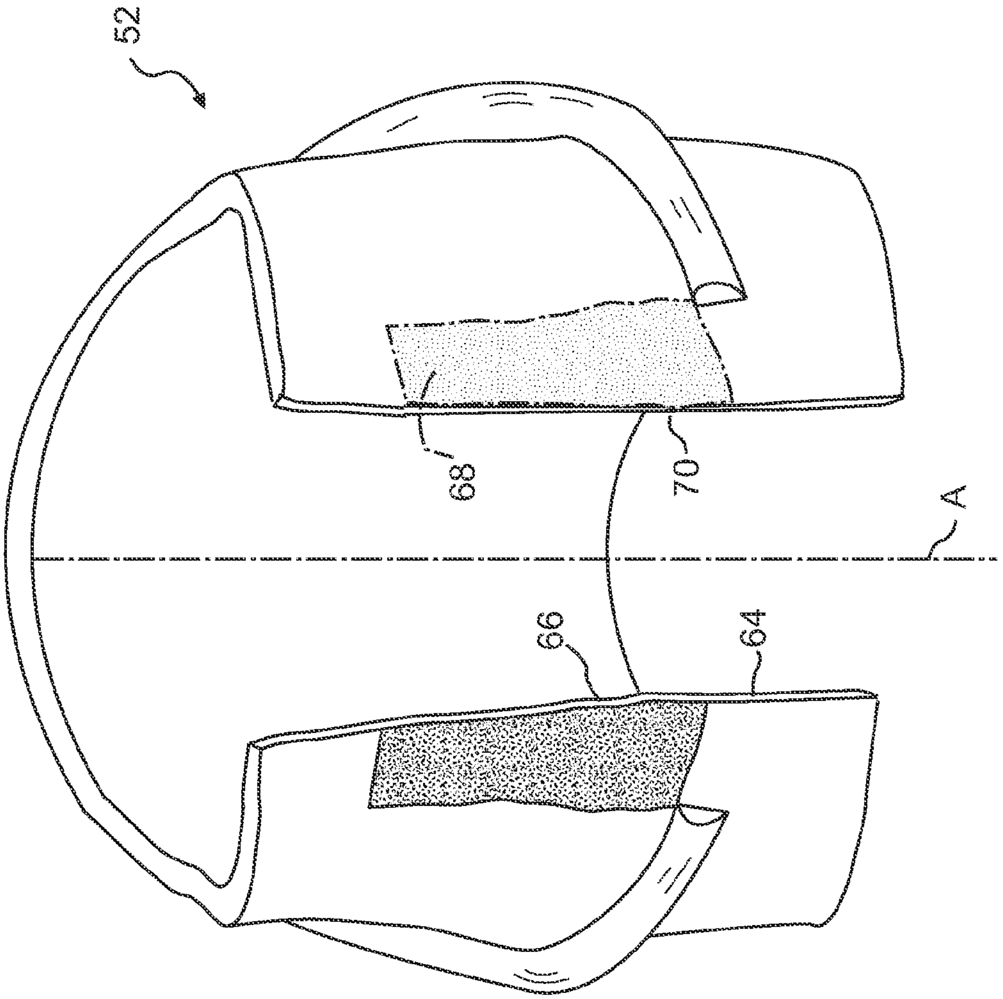
FIG. 3 is an expanded view of a tail rotor boot.

Referring to FIG. 3, the boot 52 includes a first fastener strip 64 mounted adjacent a first boot edge 66 and a second fastener strip 68 mounted adjacent a second boot edge 70. The second fastener strip 68 engageable with the first fastener strip 64 to mount the boot 52 to the inboard boot support 60 and the outboard boot support 62 (FIG. 2). The boot 52 is manufactured as a generally cylindrical rubber member defined about a longitudinal axis A. The first and second fastener strips 64, 68 are preferably "hook and loop" material to removably attach the edges 66, 70. It should be understood that "hook and loop" are described herein as a fastener system in which one strip of "hook" material is attached to one member and a loop" material is attached to the other member to provide removable attachment therebetween. It need not matter which member has "hook" material and which has "loop" material attached thereto so long as the removable attachment is provided therebetween. Preferably, the edges 66, 70 are overlapped such that aerodynamic force of the rotating blade tend to force the edges 66, 70 together. The fastener strips 64, 68 permits relatively simple removal of the boot to provide for visual inspection, a larger area to adjust the weights for the tail hub and should the boot become damaged, the tail rotor blade assemblies 28*a*, 28*b* need not be removed and shipped to a rear area facility for replacement.

The boot 52 serves to flexibly protect the interior of the tail rotor blade assemblies 28*a*, 28*b* while permitting the tail rotor assembly 24 to be pitched to deliver anti-torque compensation. In order to permit pitching the boot must be flexible, yet provide a tight fit to protect the interior components from the environment. It should be understood that various boot supports may be utilized with the present invention and the boot may be located at various locations be between various components which require flexible coverage therebetween.

Figure 4:
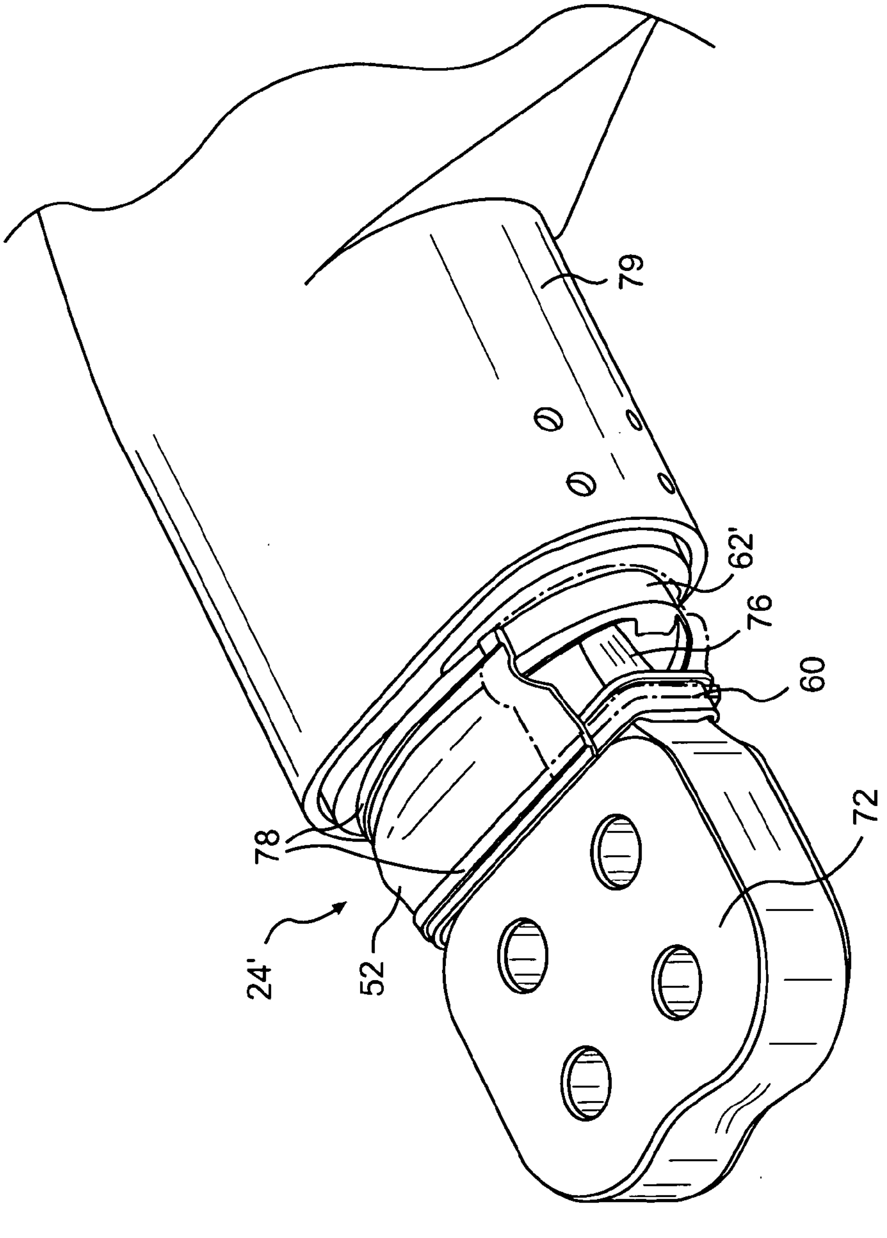
FIG. 4 is a partial sectional view of another embodiment of a tail rotor assembly.
Figure 5:
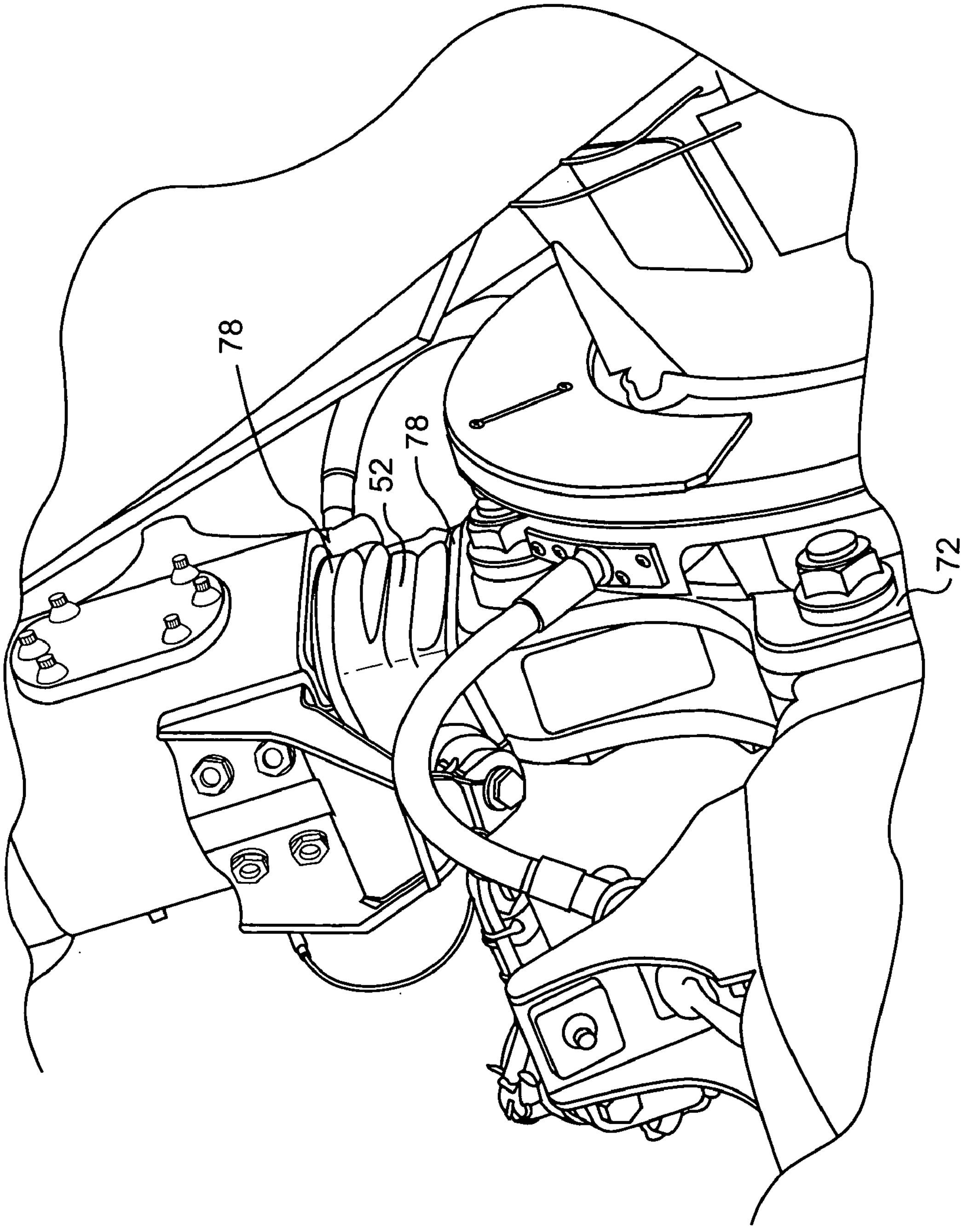
FIG. 5 is an expanded view of the tail rotor assembly of FIG. 4 mounted to a helicopter.

Referring to FIG. 4, another tail rotor assembly 24 is illustrated. The inboard boot support 60' is mounted to the spar attachment 76 which mounts the tail rotor blade at 72 to the helicopter (FIG. 5) and the outboard boot support 62' is mounted adjacent a tail rotor blade 74. A boot 52' is removably mounted between the inboard boot support 60' and the outboard boot support 62' generally as discussed above so as to cover and protect a tail rotor blade spar 76 as well as the interior of the tail rotor blade 74. Tie down straps 78 are mounted over the boot 52' and the supports 60', 62' to further retain the boot 52' thereto.

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A boot for a rotor assembly of a rotary wing aircraft comprising:
- a resilient member defined at least partially about a longitudinal axis, said resilient member including a first edge and a second edge;
- a first fastener strip mounted adjacent said first edge; and
- a second fastener strip mounted adjacent said second edge, said second fastener strip engageable with said first fastener strip such that aerodynamic forces tend to force said first edge toward said second edge.

2. The boot as recited in claim 1, wherein said first fastener strip and said second fastener strip includes a hook and loop material.

3. The boot as recited in claim 1, wherein said resilient member is generally cylindrical.

4. The boot assembly as recited in claim 3, wherein said first edge and said second edge are generally parallel to said longitudinal axis.

5. The boot as recited in claim 1, wherein said first edge at least partially overlaps said second edge.

6. A tail rotor assembly comprising:
- an inboard boot support;
- an outboard boot support;
- a boot including a first edge and a second edge;
- a first fastener strip mounted adjacent said first edge; and
- a second fastener strip mounted adjacent said second edge, said second fastener strip engageable with said first fastener strip to mount said boot to said inboard boot support and said outboard boot support such that aerodynamic tbrces tend to force sail first edge toward said second edge.

7. The tail rotor assembly as recited in claim 6, wherein said first fastener strip and said second fastener strip includes a hook and loop material.

8. The tail rotor assembly as recited in claim 6, wherein said resilient member is generally cylindrical.

9. The tail rotor assembly as recited in claim 6, further comprising a strap mountable about said resilient member and said inboard boot support.

10. The tail rotor assembly as recited in claim 6, further comprising a strap mountable about said resilient member and said outboard boot support.

11. The tail rotor assembly as recited in claim 6, wherein said first edge at least partially overlaps said second edge.

12. A tail rotor assembly comprising:
- an inboard boot support;
- an outboard boot support;
- a boot including a first edge and a second edge;
- a first fastener strip mounted adjacent said first edge; and
- a second fastener strip mounted adjacent said second edge, said second fastener strip engageable with said first fastener strip to mount said boot to said inboard boot support and said outboard boot support, wherein said inboard boot support is adjacent a tail rotor blade attachment.

13. A tail rotor assembly comprsing:
- an inboard boot support;
- an outboard boot support;
- a boot including a first edge and a second edge;
- a first fastener strip mounted adiacent said first edge; and
- a second fastener strip mounted adiacent said second edge, said second fastener strip engageable with said first fastener strip to mount said boot to said inboard boot support and said outboard boot support, wherein said outboard boot support is adjacent a tail rotor blade.

14. A tail rotor assembly comprising:
- an inboard boot support;
- an outboard boot support;
- a boot including a first edge and a second edge;
- a first fastener strip mounted adjacent said first edge; and
- a second fastener strip mounted a adjacent said second edge, said second fastener strip engageable with said first fastener strip to mount said boot to said inboard boot support and said outboard boot support, wherein said inboard boot support defines a perimeter larger than a boot perimeter when said second fastener stnp is engaged with said first fastener strip.

15. A tail rotor assembly corn rIsing:
- an inboard boot support;
- an outboard boot support;

a boot including a first edge and a second edge;

a first fastener strip mounted adjacent said first edge; and a second fastener strip mounted adjacent said second edge, said second fastener strip engageable with said first fastener strip to mount said boot to said inboard boot support and said outboard boot support, wherein said outboard boot support defines a perimeter larger than a boot perimeter when said second fastener strip is engaged with said first fastener strip.

16. A method of mounting a boot to a tail rotor assembly comprising the steps of:

(1) wrapping a boot about an inboard boot support and an outboard boot support; and (2) attaching a first fastener strip mounted adjacent a first edge of the boot to a second fastener strip mounted adjacent a second edge of the boot to mount the boot to the inboard boot support and the outboard boot support, the first edge of the boot overlapping the second edge of the boot such that aerodynamic forces tend to force the edges together.

17. A method as recited in claim 16, further comprising the step of: mounting a strap over the boot and the inboard boot support.

18. A method as recited in claim 16, further comprising the step of:

mounting a strap over the boot and the outboard boot support.

19. A method as recited in claim 16, wherein said step (2) comprises:

removably attaching the first fastener strip to the second fastener strip.

* * * * *

UNITED STATES PATENT AND TRADEMARK OFFICE

CERTIFICATE OF CORRECTION

PATENT NO. : 7,293,963 B2
APPLICATION NO. : 11/031651
DATED : November 13, 2007
INVENTOR(S) : Ozelski et al.

It is certified that error appears in the above-identified patent and that said Letters Patent is hereby corrected as shown below:

Claim 6, Column 4, line 15: “tbrces” should read as --forces--

Claim 13, Column 4, line 41: “comprsing” should read as --comprising--

Claim 13, Column 4, line 45: “adiacent” should read as --adjacent--

Claim 13, Column 4, line 46: “adiacent” should read as --adjacent--

Claim 14, Column 4, line 56: delete the second occurrence of “a”

Claim 14, Column 4, line 61: “stnp” should read as --strip--

Claim 14, Column 4, line 63: “corn rlsing” should read as --comprising--

Signed and Sealed this

Eighth Day of April, 2008

Jon W. Dudas

JON W. DUDAS
*Director of the United States Patent and Trademark Office*